(12) United States Patent
Guyan et al.

(10) Patent No.: US 7,124,112 B1
(45) Date of Patent: Oct. 17, 2006

(54) PROVIDING EVALUATION AND PROCESSING OF LINE ITEMS

(75) Inventors: G. Victor Guyan, Bethlehem, PA (US); Nicole K. Michaels, St. Paul, MN (US)

(73) Assignee: Accenture LLP, Palo Alto, CA (US)

( * ) Notice: Subject to any disclaimer, the term of this patent is extended or adjusted under 35 U.S.C. 154(b) by 0 days.

(21) Appl. No.: 09/667,612

(22) Filed: Sep. 22, 2000

(51) Int. Cl.
*G06Q 40/00* (2006.01)

(52) U.S. Cl. .......................................... 705/44; 705/35

(58) Field of Classification Search ................ 705/44, 705/4, 1, 35; 345/428
See application file for complete search history.

(56) References Cited

U.S. PATENT DOCUMENTS

| | | | |
|---|---|---|---|
| 4,858,121 A | | 8/1989 | Barber et al. |
| 4,899,292 A | * | 2/1990 | Montagna et al. ........... 345/428 |
| 5,128,859 A | * | 7/1992 | Carbone et al. ............... 705/4 |
| 5,432,904 A | * | 7/1995 | Wong .............................. 705/4 |
| 5,500,513 A | * | 3/1996 | Langhans et al. ........... 235/380 |
| 5,504,674 A | * | 4/1996 | Chen et al. ..................... 705/4 |
| 5,689,100 A | * | 11/1997 | Carrithers et al. .......... 235/380 |
| 5,870,711 A | * | 2/1999 | Huffman ......................... 705/4 |
| 5,950,169 A | * | 9/1999 | Borghesi et al. ............... 705/4 |
| 6,076,066 A | * | 6/2000 | DiRienzo et al. .............. 705/4 |
| 6,134,534 A | * | 10/2000 | Walker et al. ................ 705/26 |
| 6,578,014 B1 | * | 6/2003 | Murcko, Jr. ................. 705/26 |
| 2001/0011222 A1 | * | 8/2001 | McLauchlin et al. .......... 705/1 |

\* cited by examiner

*Primary Examiner*—Alain L. Bashore
(74) *Attorney, Agent, or Firm*—Brinks Hofer Gilson & Lione

(57) ABSTRACT

Methods, systems, and articles of manufacture consistent with the present invention use a data processing system for evaluating line item data. The method involves displaying at least one line item from a central database; receiving a selection of at least one line item from a claim handler; and receiving authorization from the claim handler to execute payment of the selected line item. The authorization is for either a direct payment, vendor transfer, line item payment, or preauthorized payment.

52 Claims, 11 Drawing Sheets

PROVIDING EVALUATION AND PROCESSING OF LINE ITEMS

BACKGROUND OF THE INVENTION

1. Field of the Invention

This patent application is related to a series of other patent applications including U.S. patent application Ser. No. 09/667,637, filed Sep. 22, 2000 and entitled "LINE ITEM DATA PROCESSING," and U.S. patent application Ser. No. 09/667,611 filed Sep. 22, 2000 and entitled "CAPTURE HIGHLY REFINED CLAIM EVALUATION INFORMATION ACROSS MULTIPLE WEB INTERFACES." This patent application and the noted other patent applications have common inventors and are assigned to a common entity.

This invention relates to insurance claims processing and, more particularly, to an apparatus and methods for capturing highly refined claim evaluation information across multiple web interfaces. This invention also relates to an apparatus and methods for capturing, evaluating, and fulfilling line item claim evaluation information in a wide spread network environment, such as the Internet.

2. Description of the Related Art

While a great deal of commercial and industrial businesses have embraced automation and have migrated manual systems to computer based systems over the last several decades, the insurance industry, and more particularly the claims processing industry, have been slow to embrace this trend. Although certain aspects of a claim may be recorded in electronic format by the claims handler, most evaluation, processing and fulfillment of claims is done manually. In addition, claim information is generally not electronically transferred from the claimant to the claims handler's system, rather claim information is usually communicated to the claims handler verbally or in written form. Even in cases where the claimant may have the claims information detailed in an electronic format in the claimant's computer systems, as in the case of most medical claims by doctors and hospitals, electronic systems and links are not in place to transfer this detailed information to the claims handler's system.

In a few rare instances, the insurance industry has performed some level of automation in the processing of claims. Many insurance back office systems have the ability to cut checks to pay claimants for losses or reimburse claimants for expenses. These back office systems can track the processing checks, as well. However, there is no linkage between the cutting of a check in the back office system and the line item fulfillment for which the check is cut.

The most detailed area of claims processing is the handling of line items, which are itemized incidents of loss. Because of the manual nature of claims processing, the claims handler spends a great deal of time entering claim information into computer systems, tracking claims processing of line item details, evaluating line item details, and fulfilling line item data. Claims handlers are busy professionals who have to spend an inordinate amount of time on clerical details. This creates a tremendous potential for errors in the claims processing arena. These errors may result in overpayment or underpayment of claims that may harm the insurance company or damage the relationship between the insured, claimant and insurance company. Automating the claims processing field greatly reduces these errors and improve efficiency.

In addition, the current insurance industry does a poor job of maintaining relationships with vendors who could fulfill certain line item losses. Insurers currently fund the replacement of many items that ought to be subject to a negotiated volume buying arrangement. Such items include: electronics, computer equipment, clothing, medical services, auto body repair, carpeting, auto parts, appliances, furniture and pharmaceuticals. However, other than glass and some automotive services, the process and technology do not support creative volume purchasing agreements. The current process for replacing personal property, for instance, involves numerous steps and an arduous process for the claimant and the claim handler. The insurance carrier is left with little insight into the nature or quantity of items that they fund. Often, when the claim exceeds the limit of insurance, the insurance carrier simply cuts a blanket check for a loss, recording only some of the evidence of loss, and does not know what was purchased with the proceeds or where it was purchased.

There is therefore a need for a system or process that can gather line items effectively from claimants without involving the claims handler. The claims handler needs a system or process to automate and track claims down to the line item level without being overly burdensome. The insured, claimant and insurance carrier benefit from a system or process that leverages vendor relationships to effectuate the cost effective fulfillment of line items. In general, a system or process is needed to externalize the burdensome aspects of claims processing, or loss inventorying, while speeding claims processing, lowering costs, gathering data about the claims process, and increasing the satisfaction of the insured and claimant.

SUMMARY OF THE INVENTION

Methods, systems, and articles of manufacture consistent with the present invention overcome the shortcomings of existing systems by capturing, evaluating, and fulfilling line item data. In one implementation consistent with the present invention, an insurance host server provides line item data to a claim handler client for evaluation and receives evaluation information from the claim handler.

In another implementation consistent with the present invention, the insurance host server validates the identity of a claims handler, displays a line item level database, and receives evaluation information associated with a line item in the line item level database.

BRIEF DESCRIPTION OF THE DRAWINGS

The accompanying drawings, which are incorporated in and constitute a part of this specification, illustrate an implementation of the invention and, together with the description, serve to explain the advantages and principles of the invention.

In the Drawings

DETAILED DESCRIPTION

Reference will now be made in detail to an implementation consistent with the present invention as illustrated in the accompanying drawings. Wherever possible, the same reference numbers will be used throughout the drawings in the following description to refer to the same or like parts.

Network Architecture

Figure 1:
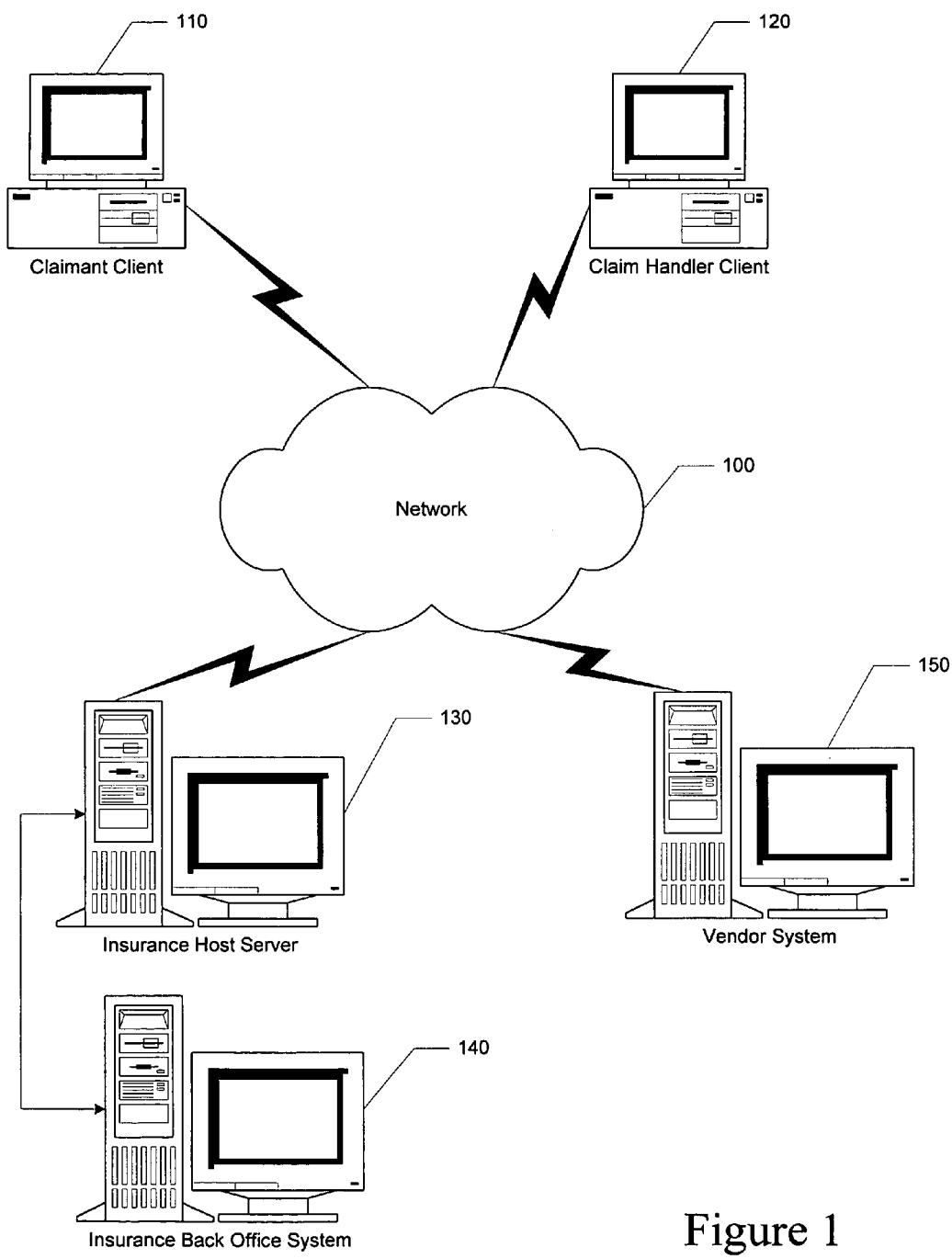
FIG. 1 is a pictorial diagram of a computer network in which systems consistent with the present invention may be implemented.

FIG. 1 is a pictorial diagram of a computer network in which systems consistent with the present invention may be implemented. Computer network 100 comprises personal or workstation computers (such as computers 110 and 120) and system or enterprise computers (such as server 130, system 150, and system 140). In general, personal computers or workstations are the sites at which a human user operates the computer to make requests for data from other computers or servers on the network. Usually, the requested data resides in system or enterprise computers. In this scenario, computers are termed client computers, server computers, or system computers.

In this specification, the terms "client" and "server" are used to refer to a computer's general role as a requester of data (client) or provider of data (server). In addition, computers referred to as "system" refer to computers whose general purpose may be as both requesters of data or providers of data. In general, the size of a computer or the resources associated with it do not preclude the computer's ability to act as a client, server, or system. Further, each computer may request data in one transaction and provide data in another transaction, thus changing the computer's role from client to server, or vice versa.

A client, such as claimant client 110, may request information from insurance host server 130. In this case, data from insurance host server 130 is transferred through the network 100 to claimant client 110. Network 100 represents, for example, the Internet, which is an interconnection of networks. The distance between claimant client 110 and insurance host server 130 may be very long, e.g. across continents, or very short, e.g. within the same city. Furthermore, in traversing the network the data may be transferred through several intermediate servers and many routing devices, such as bridges and routers.

In systems consistent with the invention, insurance host server 130 maintains a database of claim folder information. Claimant client 110 accesses insurance host server 130 to update, enter, or review claim folder information. Claim handler client 120 accesses insurance host server 130 in order to review, evaluate, and/or fulfill claim folder data. Vendor system 150 interconnects to insurance host server 130 through network 100 in order to: receive order placement from insurance host server 130; update database information to insurance host server 130; respond to database access requests from insurance host server 130; and update or respond to status information from insurance host server 130. Insurance back office system 140 interfaces to insurance host server 130 in order to: receive check requests from insurance host server 130 and update insurance host server 130 as to the status of checks cut from the system. While in FIG. 1, the insurance back office system 140 and the insurance host server 130 communicate by a link outside of network 100, it is contemplated that their communication may be via network 100. In another embodiment, vendor system 150 may be directly linked to insurance host server 130 without communicating through network 100. However, in FIG. 1, network 100 facilitates communication between disperse and varied computers and networks through industry wide communication protocols, such as the TCP/IP standards suite.

Figure 2:
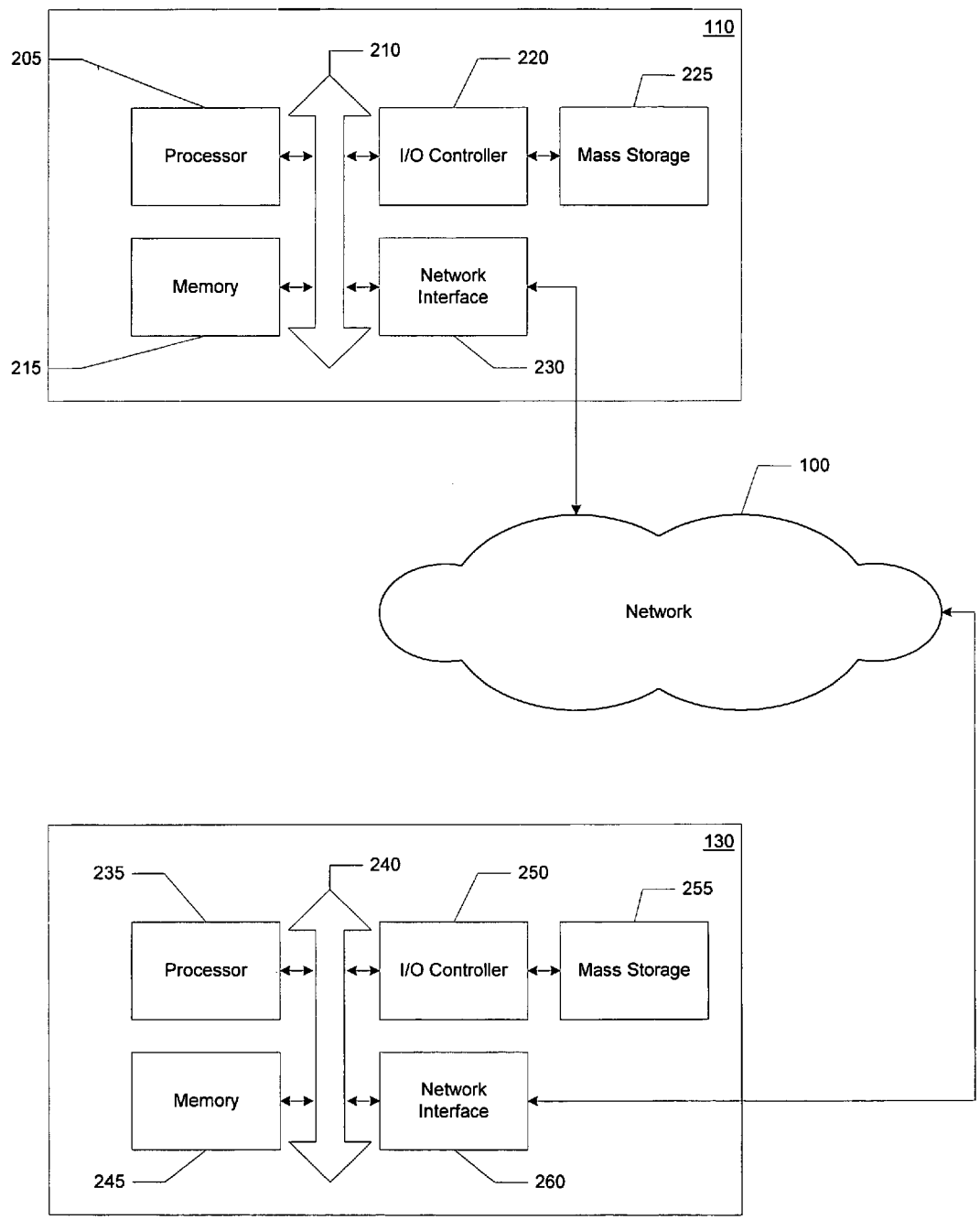
FIG. 2 shows a computer network containing an insurance host server and a claimant client.

FIG. 2 shows a computer network containing an insurance host server 130 and a claimant client 110. In this example, a claimant client 110 is interconnected through network 100 to the insurance host server 130. Claimant client 110 includes conventional components, such as processor 205, memory 215, I/O controller 220, and network interface 230. The processor 205, memory 215, I/O controller 220, and the network interface 230 are interconnected through a bus 210. Mass storage 225 is interconnected to the system through I/O controller 220. The architecture illustrated in claimant client 110 is typical for a "PC" type computer, although any type of computer capable of running an Internet browser is contemplated. While a PC typically runs WINDOWS® from Microsoft Corporation, a browser can run on claimant client 110 processing any operating system, such as MacOS, WINDOWS 2000, LINUX, or SOLARIS operating systems.

Network 100 is an interconnection of computer networks, typically the Internet. Network interface 230 connects to the network 100. Network interface 230 may be a modem, cable modem, DSL modem, or any type of network adapter.

Insurance host server 130 includes conventional components, such a processor 235, memory 245, I/O controller 250, and network interface 260. The processor 235, through a bus 240. Mass storage 255 is interconnected to the system through I/O controller 250. The architecture illustrated in insurance host server 130 is typical for a "PC" type computer, although any type of computer capable of running an Internet web server is contemplated In systems consistent with the invention. While a PC typically runs WINDOWS® software from Microsoft Corporation, a web server can run on any number of hardware and operating system combinations, such as MacOS, WINDOWS 2000, LINUX, VMS or SOLARIS operating systems. Network interface 230 may be a modem, cable modem, DSL modem, or any type of network adapter. In addition, mass storage 255 may be local and connected to the I/O controller as shown, or it, or additional database storage, may be located remotely from the insurance host server via the network interface 230.

It will be appreciated from the description below, that the present invention may be implemented in software which is stored as executable instructions on a computer readable medium on the client server and systems, such as mass storage devices 225 and 255, respectively, or in memories 215 and 245, respectively.

Claims Folder Hierarchy

Figure 3:
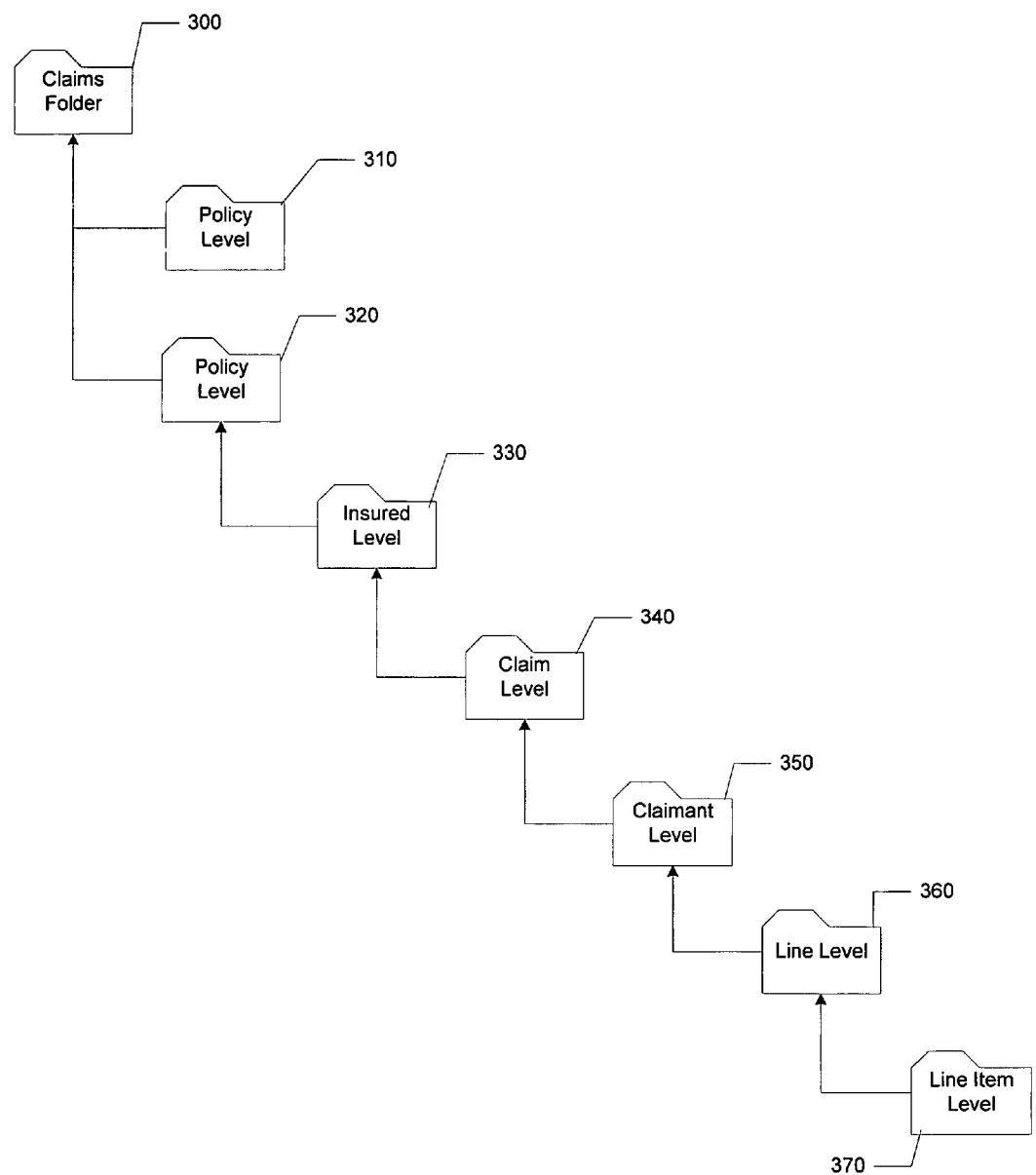
FIG. 3 illustrates the hierarchy of the various levels within a claims folder.

In order to facilitate the understanding of processing insurance claims at the line item level, the claims folder hierarchy within which the line level resides is first discussed. FIG. 3 illustrates the hierarchy of the various levels within a claims folder.

First, it is useful to define some terms. An insured is one who is insured by the policy; a claimant is one who is making a claim against the policy. Sometimes they are the same individual, as in the case of a theft claim against a homeowners policy. Other instances dictate that they be different, as in the case of a workers compensation claim where the insured is the employer and the claimant may be the employee.

The electronic claims folder 300 hierarchy is similar to the manual filing system, and certain electronic file systems, now in place with insurance companies. Claims folder 300 contains all of the policy information, information about the insured, and information about claims for a given client. Within a claims folder 300 are one or more policy levels 310 and 320. While in this example, two policies 310 and 320 are illustrated, it will be appreciated that there could be as few as a single policy for a given customer or multiple policies for a given customer. Throughout the rest of this discussion, only a single folder of each level is illustrated. The policy level 320 contains all the information relevant for a given policy. For example, the policy level for an auto insurance policy contains information about the various coverage, such as collision, medical, comprehensive, and the deductibles. For homeowner's insurance, the policy level contains information about the address of the home insured, liability levels, specific riders, and other relevant data.

Below policy level 320 is insured level 330. Insured level 330 contains all information relevant about the insured. For instance, the insured level contains the insured's name, address, date of birth, number of dependents, emergency contact information, and all information relevant to the insured for that particular policy. The insured level 330 for one policy 320 may contain different information than the insured level for a different policy 310. For instance, if policy level 320 is directed at automobile insurance for a family, the insured level 330 contains information about all drivers residing within that household; whereas, the insured level for a policy level 310 directed at a life insurance policy only contains information at the insured level directed towards the individual whose life was insured.

Below the insured level 330 is the claim level 340. The claim level 340 has general information about the claim raised against the policy. The claim level 340 may include the date of the claim, the nature of the claim, and general information relevant to the type of claim. A property loss claim may include information about the police report or the nature of the theft. A medical claim contains information about the general nature of the medical situation.

The claimant level 350 is below and within the claim level 340 and has full details about the claimant. The claimant's name, address, phone numbers, and other general contact information is within this level. As stated previously, the claimant and the insured may or may not be the same person or entity depending on the nature of the claim. In addition, for any particular claim, there may be multiple claimants. For instance, an automobile accident claim may generate a wide number of claimants: the insured, the owner of another vehicle, injured passengers, or the owner of property damaged in an accident. The above list is not exhaustive and is intended to only be illustrative of the types of claimants.

Below and within the claimant level 350 is the line level 360 which details the various types of claimed damages levied by a particular claimant. A single claimant might have multiple types of claims. For instance, a driver of an automobile may have injury claims and property damages claims. The two claims are represented by two different lines within the line level.

Systems and processes consistent with the present invention operated at the line item level 370 within the line level 360. The line item level 370 includes detailed line items, or line item data, for each claim against a particular line in the line level 360. For instance, a property theft line claim includes line item data for each piece of property stolen. This is the most detailed level within the entire claims folder. The line item data is stored within a line item database. Line item data fields vary depending on the nature of the item. For a property loss claim, line item data fields include the type of property lost, the actual cash value, the replacement cash value, the amount paid for the item, whether the item was a gift or not, documentation for the item, and other information as it gets processed through the system of the present invention.

Line Item Level Processes

Figure 4:
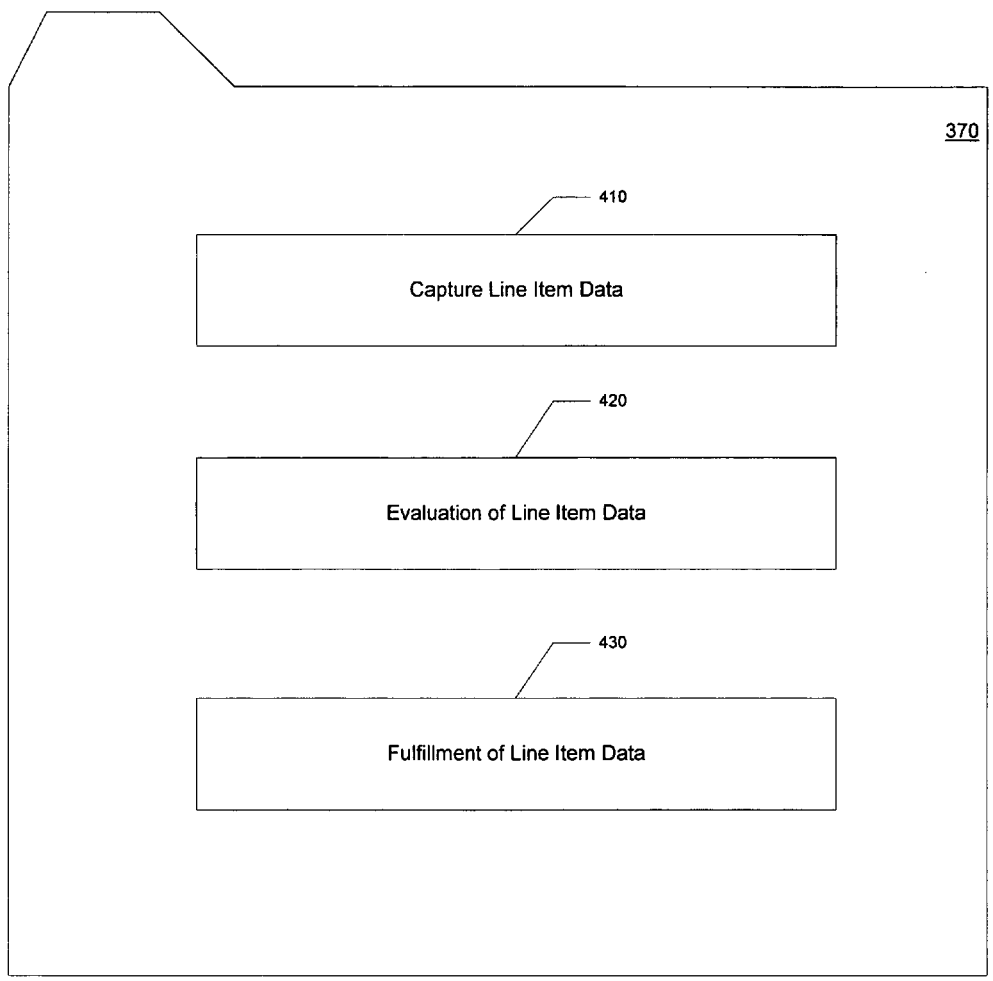
FIG. 4 illustrates the processes that run within the line item level of the claims folder.

FIG. 4 illustrates the three processes that run inside line item level 370. The capture line item data process 410 receives line item data entered by claimant client 110 or claim handler client 120 into the line item database stored in insurance host server 130. The evaluation of line item data process 420 presents line item data to a claim handler at claim handler client 120 and authorizing the payment and processing of line item data. In addition, the evaluation of line item data process 420 interfaces between insurance host server 130 and insurance back office system 140 for determining what is covered and the mode of indemnification (payment or vendor replacement). Fulfillment of line item data process 430 interfaces between insurance host server 130 and vendor system 150 for check or vendor processing and for placing order with vendors, updating database information from the vendor, accessing vendor database information and performing status inquiries on placed vendor orders.

Data Interchange Between Clients, Servers, and Systems

Figure 5:
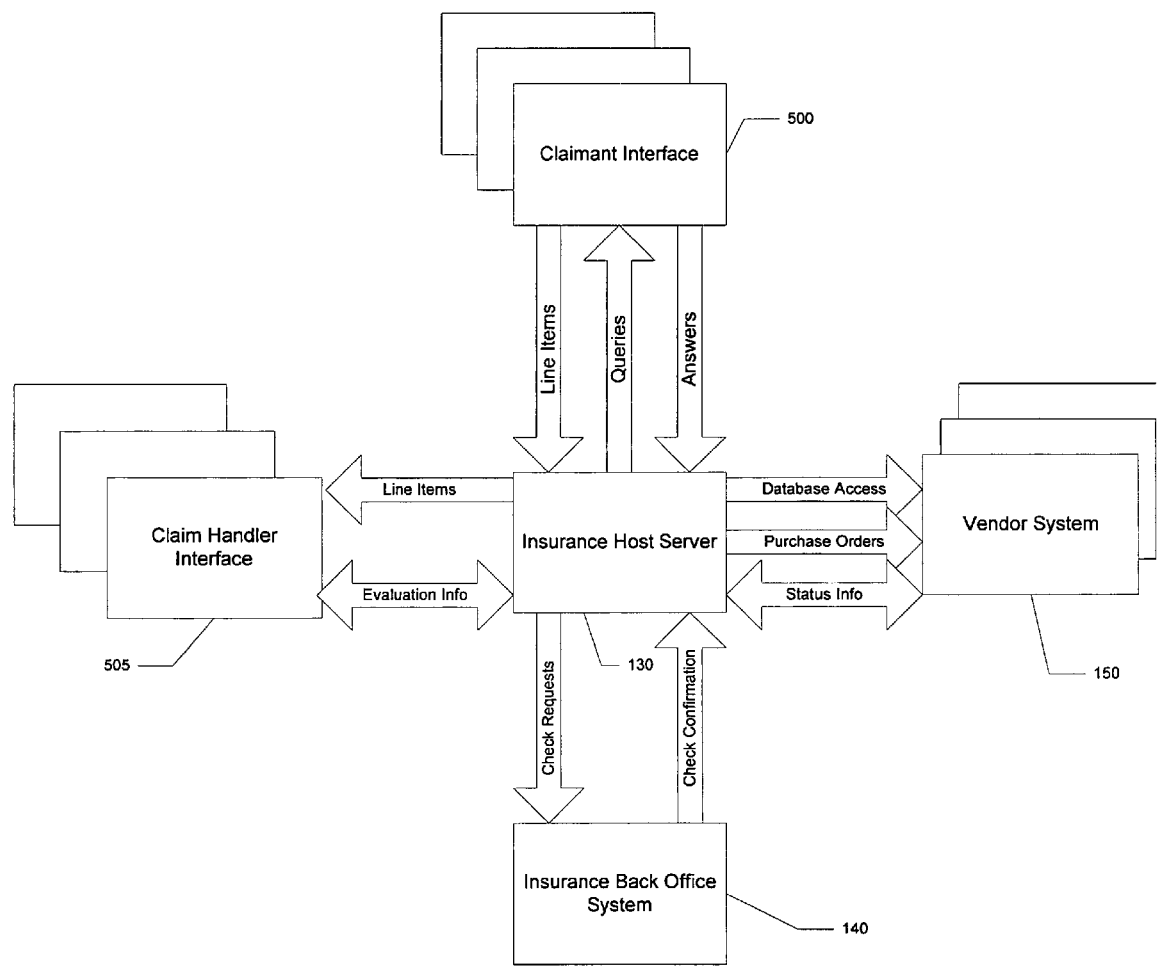
FIG. 5 is a block diagram illustrating communication between the insurance host server, claimant interface, vendor system, insurance back office system, and claim handler interface

FIG. 5 is a block diagram of the data interchange between insurance host server 130, claimant interface 500, vendor system 150, insurance back office system 140 and claim handler interface 505. In order to help facilitate a better understanding of the functionality of the system, FIG. 5 illustrates the flow of information between the various clients and servers. Beginning at the top of the figure, a claimant on claimant client 110 operates claimant interface 500 to interact with insurance host server 130. Claimant interface 500 is a web browser. Using a standard web browser, such as Internet Explorer or Netscape Navigator, claimant interface 500 exchanges HTML data with insurance host server 130 operating an HTML server thus facilitating the operation across a wide array of hardware/operating system platforms. While a proprietary claimant interface 500 could be used, the open standard, web based interface allows any claimant access to the system without having to first receive proprietary software from the insurer.

A claimant on claimant client 110 uses claimant interface 500 to access insurance host server 130. Generally, this involves typing a URL location into the web browser. The URL location is the URL of the insurance host server 130. Alternatively, the claimant interface may access insurance host server 130 by clicking on a link on an existing website.

In the illustrated embodiment, the claimant accesses the insurance host server 130 after having "tunneled down" a website that was being accessed at one of the higher levels within the claims folder, e.g., from the claim level. Once access from claimant interface 500 to insurance host server 130 is granted, the claimant through claimant interface 500 may enter line items into the line item level database in insurance host server 130, and insurance host server 130 may present various queries to the claimant at claimant interface 500 to which the claimant gives responses. For instance, insurance host server 130 may ask claimant whether he wants a traditional paper check issued to fulfill losses or whether an electronic fund transfer is preferred to which the claimant answers.

Claim handler interface 505 running on claim handler client 120 is also a web browser. Like claimant interface 500, the claim handler interface 505 may be proprietary software or non-proprietary software such as a web browser. The claim handler interface accesses insurance host server 130 for the exchange of HTML data. Line item data is accessed by claim handler interface 505 from insurance host server 130, and evaluation information is exchanged between claim handler interface 505 and insurance host server 130.

Insurance back office system 140 interfaces to insurance host server 130. The interface, as discussed earlier, can be a direct interface or the interface could be via network 100. Insurance back office system 140 is generally a legacy system that already exists within the insurance company. The system 140's responsibilities include financial processing, for which one of the features is to issue payments. Insurance host server 130 in response to instructions from a claim handler operating from claim handler client 120 typically issue check requests to insurance back office system 140. In addition check status information and confirmation is sent from insurance back office system 140 to insurance host server 130.

Vendor system 150 interfaces to insurance host server 130 generally over network 100, but it could also be a direct link between the two systems. Insurance host server 130 may access the vendor database of line items supplied residing on vendor system 150. Alternately, the vendor may upload the entire content of the vendor line item database to insurance host server 130 so that it may reside locally to insurance host server 130. Such local access to the vendor database speeds processing of vendor orders. Insurance host server 130 issues purchase order requests to vendor system 150, thus placing orders for the fulfillment of various line item data. In addition, the insurance host server 130 may issue preauthorized payment information to vendor system 150. Also, between insurance host server 130 and vendor system 150, status information is exchanged.

Capturing Line Item Data

Figure 6:
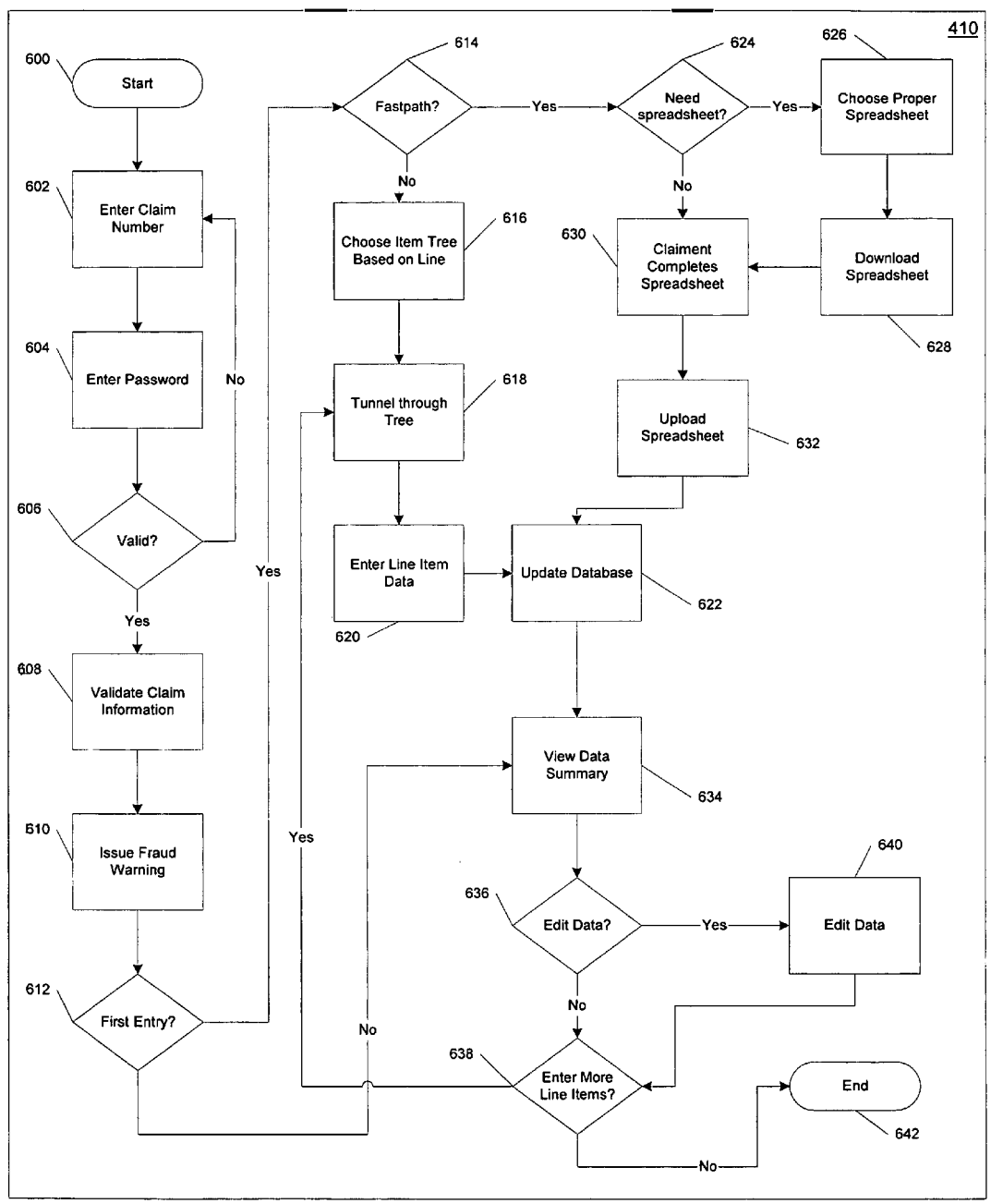
FIG. 6 is a flowchart of the steps performed by the capture line item data process in a manner consistent with the principles of the present invention.

FIG. 6 illustrates a flowchart of the capture line item data process 410. The capture line item data process 410 is generally initiated by a claimant operating on claimant client 110, although a claim handler could also invoke the capture line item data process 410 through claim handler client 120. Such is the case when the claimant is not comfortable with or has no access to a computer. The capture line item data process 410 is initiated after the claimant has "tunneled down" to the line item level web screen served by the insurance host server 130. In this embodiment, the claimant selects an option offering to be taken to a web screen for an existing claim.

The process starts when a claimant elects (step 600) to be taken to an existing claim. When the process is started, the insurance host server 130 serves up a logon screen to claimant interface 500. The insured enters a claim tracking number (step 602) which had been previously given upon reporting of a claim. The claimant enters a password (step 604) that he had also been previously given along with his claim number. This unique claim number/password combination prevents someone other than the claimant, or a claim handler with access to this information, from entering any line item data into the line item level database. The claim interface 500 verifies the claim number and password to insurance host server 130 where insurance host server 130 accesses the claim level database and validate that the claim number and password are valid (step 606). If the claim number and password combination are not valid, the claimant is given an opportunity to reenter the claim number and password (steps 602 and 604).

If the claim number and password are a valid combination, various data from the policy level, insured level, claim level, claimant level, and line level is displayed in a web page served by insurance host server 130 to claimant interface 500 (step 608). The data includes items, such as the date of the loss or injury, time of the loss or injury, policy number, Social Security Number of the claimant, the claimant's name, address and phone numbers. At this point, the claimant is given the opportunity to verify that this information is accurate and change any of the claimant level information presented on the screen. Thus, if the claimant had moved or his phone number had changed, he could update it at this point.

Once the claim information is verified, insurance host server 130 serves the claimant interface with a fraud warning (step 610). The fraud warning could be in the form of text or in the form of a sound file sent to the claimant interface 500 that gives a formal reminder to the claimant of the risks associated with insurance fraud. In addition, at this step, the claimant could be presented with information about the insurance company's direct replacement services whereby line items, for instance in the case of a theft, could be directly replaced by a local vendor without the claimant having to purchase the items himself.

After the user clicks that he has read the fraud warning and goes past any description of direct replacement services, the insurance host server 130 examines whether any line item level data has already been entered for this particular line level (step 612). If line item level data is already present in the line item level database for that line level, a summary of all of the line item level data is displayed (step 634).

The insurance host server 130 gives the claimant the option of entering his data in FastPath™ format (step 614). Fast Path™ is an opportunity for the claimant to upload a blank, but formatted, spreadsheet from insurance host server 130 to claimant client 110. Using the Fast Path™ option, the claimant at claimant client 110 fills in the spreadsheet with all of his line item level data and then upload the spreadsheets. This is used for more sophisticated users. However, it provides a faster method to enter line item level data than the web based process, which is the non FastPath™.

If the user selects the Fast Path option, the insurance host server 130 queries the claimant client 110 to determine whether a spreadsheet needs to be downloaded from insurance host server 130 to claimant client 110 (step 624). Each of the wide variety of types of claims, e.g., medical, property, automotive requires different spreadsheets in order to enter the line item level data. The insurance host server 130 can query claimant client 110 either by asking the claimant directly whether a spreadsheet needs to downloaded to the claimant, or by checking a cookie that is left within the claimant client noting whether the claimant client had that particular spreadsheet. If the claimant client needs the appropriate spreadsheet, the insurance host server 130 determines the appropriate spreadsheet for that type of insurance claim (step 626), and downloads the appropriate spreadsheet to the claimant client 110 (step 628). The claimant on claimant client 110 completes the spreadsheet (step 630) and uploads the completed spreadsheet with all of the line item data into insurance host server 130 (step 632).

If the claimant chooses to not use the FastPath™ option, the insurance host server tunnels down through the item tree (step 616). Stored on insurance host server 130 are a plurality of item tree. For each different type of insurance, there is a different item trees. For instance, for property insurance on a theft, the top level of the item tree may display groups such as electronics, jewelry, furniture, appliances, miscellaneous personal property, furnishings, clothing, and additional living expenses. Within each of these categories there are subcategories and possibly further subcategories until you get actual items. For instance, beneath the category electronics, there may be VCRs, televisions, stereos, and computers. Then, within each of those categories, for instance televisions, there may appear a detailed list of all of the possible types of televisions. The insurance host server 130 chooses the appropriate item tree based on the line and displays the top level of that tree in a web page to the claimant via claimant interface 500 (step 616).

The claimant tunnels through the tree of line item data until he reaches the line item that he wishes to enter (step 618). The claimant enters the line item data (step 620). Line item data includes detailed information about the line item particular to that item. For instance, for property insurance, the line item may include data that includes the type of item, the location of the item in the home, how many of the item were stolen, the cost of the item, the year of purchase, the name of the owner, where the item was purchased, and check boxes indicating whether there are any receipts, photos, manuals, or other documentation that that particular item was actually in the house. In addition, the line item data includes a serial number, if known, and an option for direct replacement services. Direct replacement services means that the insurance company contacts a vendor directly for replacement of this item. The line item data for a medical injury is very different. It includes information about the treatment, the date that the treatment was performed, the status of the treatment, the provider of the treatment, an ICD-9 code indicating the treatment and other medical details. Medical line items might also include the devices used during the recovery from injury or to assist the person in the case of a permanent disability: prosthetic devices, crutches, wheel chairs, eye wear, hearing aids, etc. The line item data varies for each type of item. The line item data is used to update the line item level database residing in the insurance host server 130 (step 622).

The updated line item level database is displayed in summary form as a web page from insurance host server 130 to claimant interface 500, including the newly entered line item level data (step 634). The claimant is able to edit specific line item level data by double clicking on that particular line item (step 636), thereby he is taken to the line item data entry screen and allowed to change various features of the line item data in the edit data block (step 640). The claimant is given the option to enter more line items (step 638). If not, the capture line item data process ends (step 642).

Evaluation of Line Item Data

Figure 7:
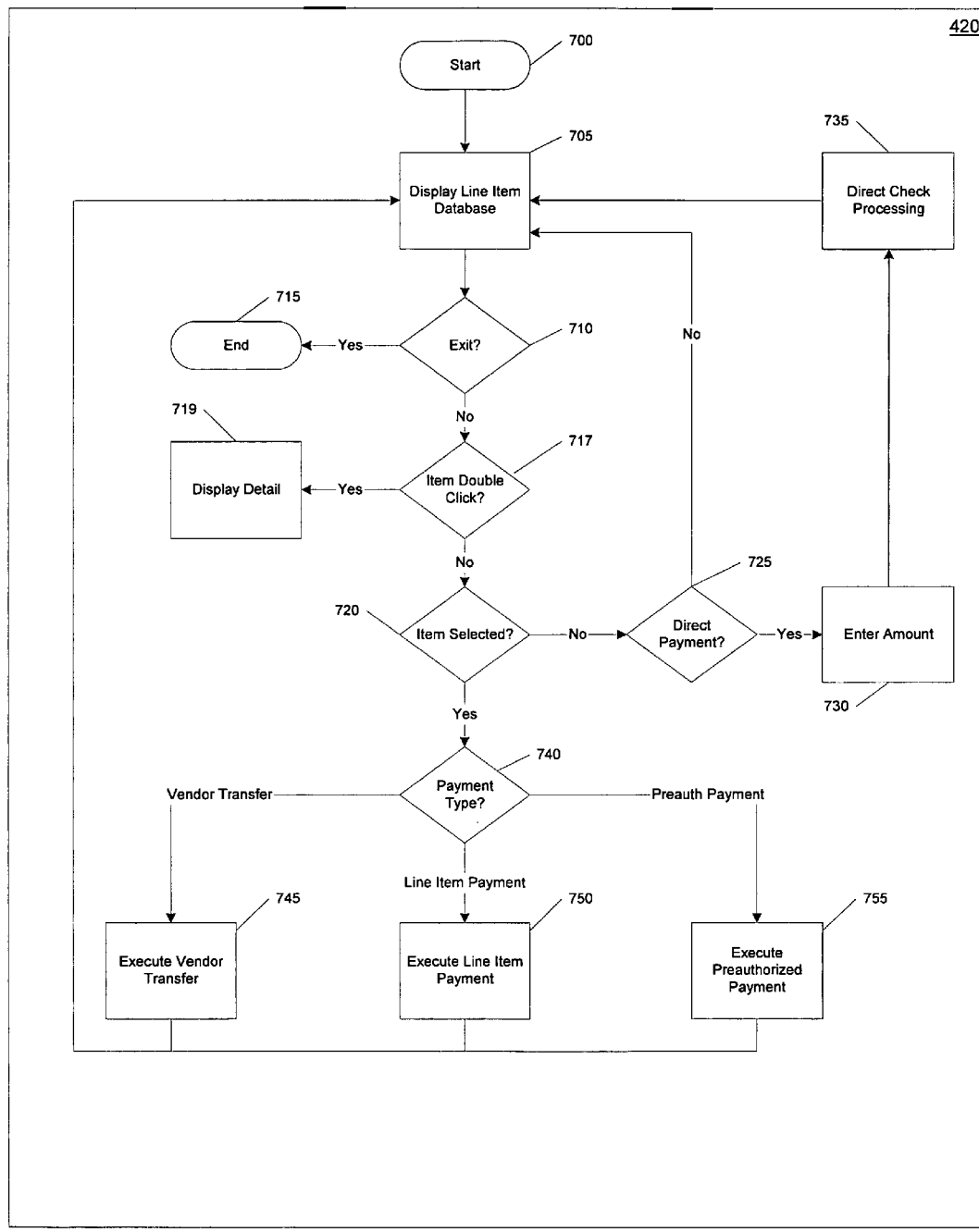
FIG. 7 is a flowchart of the steps performed by the evaluation of line item data process in a manner consistent with the principles of the present invention.

FIG. 7 is a flowchart illustrating the evaluation of line item data process 420. Once line item level data has been captured, the claim handler must begin the evaluation process. Claim handler interface 505 operates on claim handler client 120, which is connected to insurance host server 130 via network 100. The evaluation of line item data is also known as settlement. Initially, a claim handler operating claim handler client 120 logs onto the insurance host server 130 (step 700). Once logged on, the claim handler tunnels down through the claims folder until he reaches the line item level for the particular policy/claim/claim level/line level of interest. Upon reaching the line item level, the line item database for that level is displayed (step 705). As mentioned earlier, the line item level database includes all information about each line item. The claim handler may exit the evaluation of line item data process (step 710) and, if so, proceeds to the evaluation of line item data process (step 715). If a claim handler double clicks on a particular piece of line item data (step 717), a display detail screen is served (step 719). The display detail screen contains all of the evaluation information already entered for the line item, and the claim handler may update or change the evaluation information.

If no item is double clicked, flow proceeds to where, if an item is selected (step 720), the claim handler is able to choose a payment type (step 740). If no item is selected, the user has the option of issuing a direct payment (step 725). If the user wishes to make a direct payment, the claim handler enters an amount for direct payment (step 730). A direct payment is used where, for instance, there is a large loss and the claim handler wishes to quickly get a payment sent to the claimant so that the claimant can begin to settle some of his losses. For instance, after a house fire, the claim handler may wish to quickly cut a check to cover living expenses while the claim is being processed. Once the amount is entered, payment processing commences (step 735). Insurance host server 130 communicates with insurance back office system 140 and directs insurance back office system 140 to issue payment to the claimant (step 730). Payment may be in the form of a check or an electronic fund transfer. At this step, the claim handler is able to enter further information necessary for the check or the electronic fund transfer, and the display line item database is once again presented to the claim handler (step 705).

If an item is selected, the claim handler may choose one of three options (step 740): first, he may execute a vendor transfer (step 745); second, he may execute a line item payment (step 750); and, third, he may execute a preauthorized payment (step 755). An explanation of these three processes follows.

The Vendor Transfer Process

Figure 8:
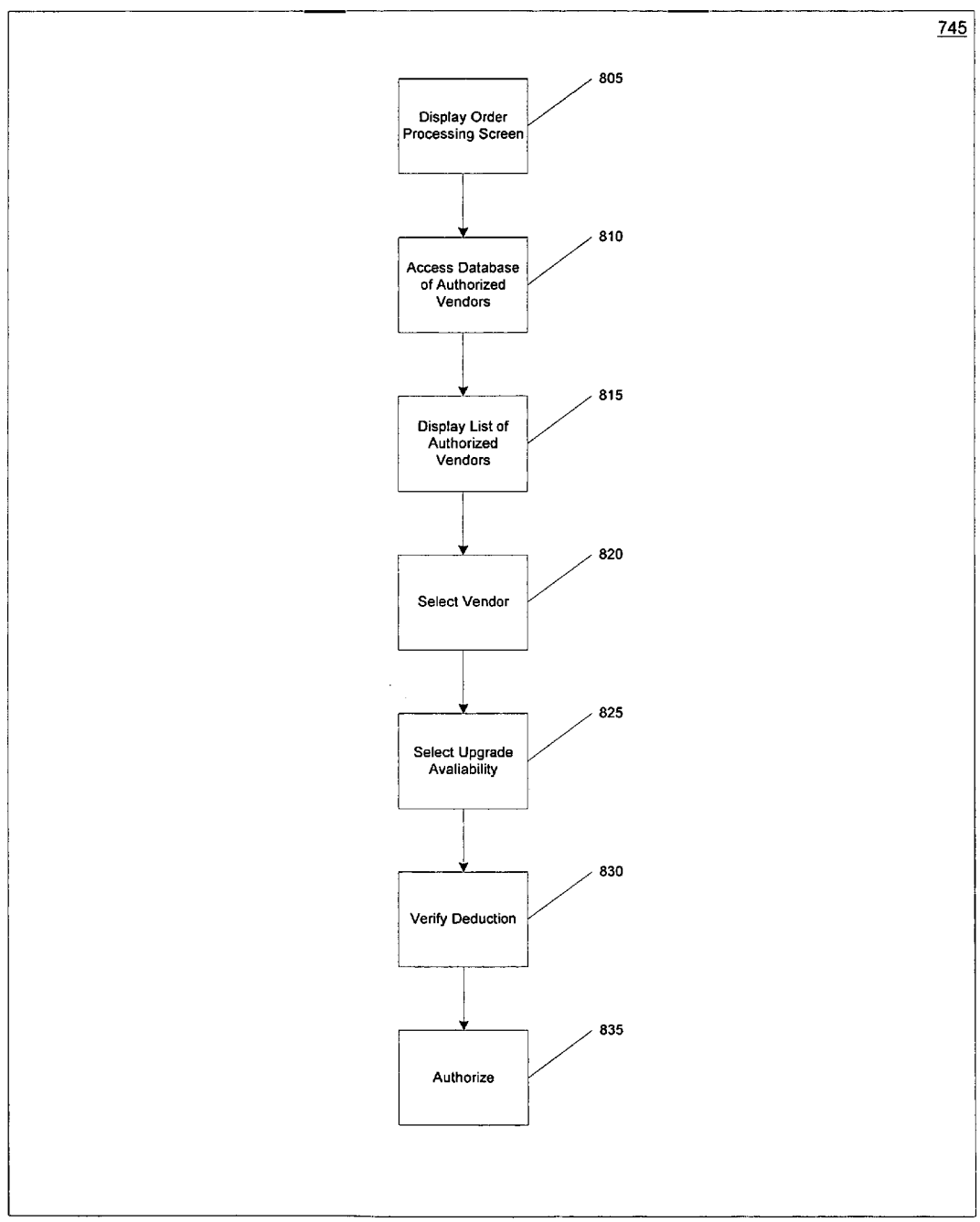
FIG. 8 is a flowchart of the steps performed when executing vendor transfers in a manner consistent with the principles of the present invention.

FIG. 8 illustrates a flowchart of the execute vendor transfer process 745. If while entering line item data (step 620), the claimant indicated that he was amenable to a direct vendor transfer, the claim handler can arrange for fulfillment of a line item data settlement by placing an order directly with a vendor. An order processing screen is displayed allowing the claim handler to interface with the insurance host server 130 (step 805). The selected line item level data appears on the screen. Next, the insurance host server 130 cross-references the type of line item level data with the vendor database and queries for a listing of authorized vendors for that particular type of line item data (step 810). The list of authorized vendors appears on the order processing screen (step 815).

The claim handler selects a particular vendor based on the list of authorized vendors previously displayed (step 820). The claim handler notes whether notes an upgrade is available to be purchased by the claimant from the vendor (step 825). For instance, the claimant may wish to use his own money to replace his lost piece of electronics with a better grade of electronics. The claim handler verifies the deductible based on the policy of the insured, and if necessary can adjust that deductible (step 830). In addition, the claim handler can note whether the deductible needs to be collected from the claimant prior to or upon delivery and fulfillment of the line item data by the vendor. The claim handler authorizes the vendor transfer (step 835). When this authorization takes place, the insurance host server is approved to place the order with the vendor system 150 as further described in the fulfillment of line item data process 430.

Line Item Payment Process

Figure 9:
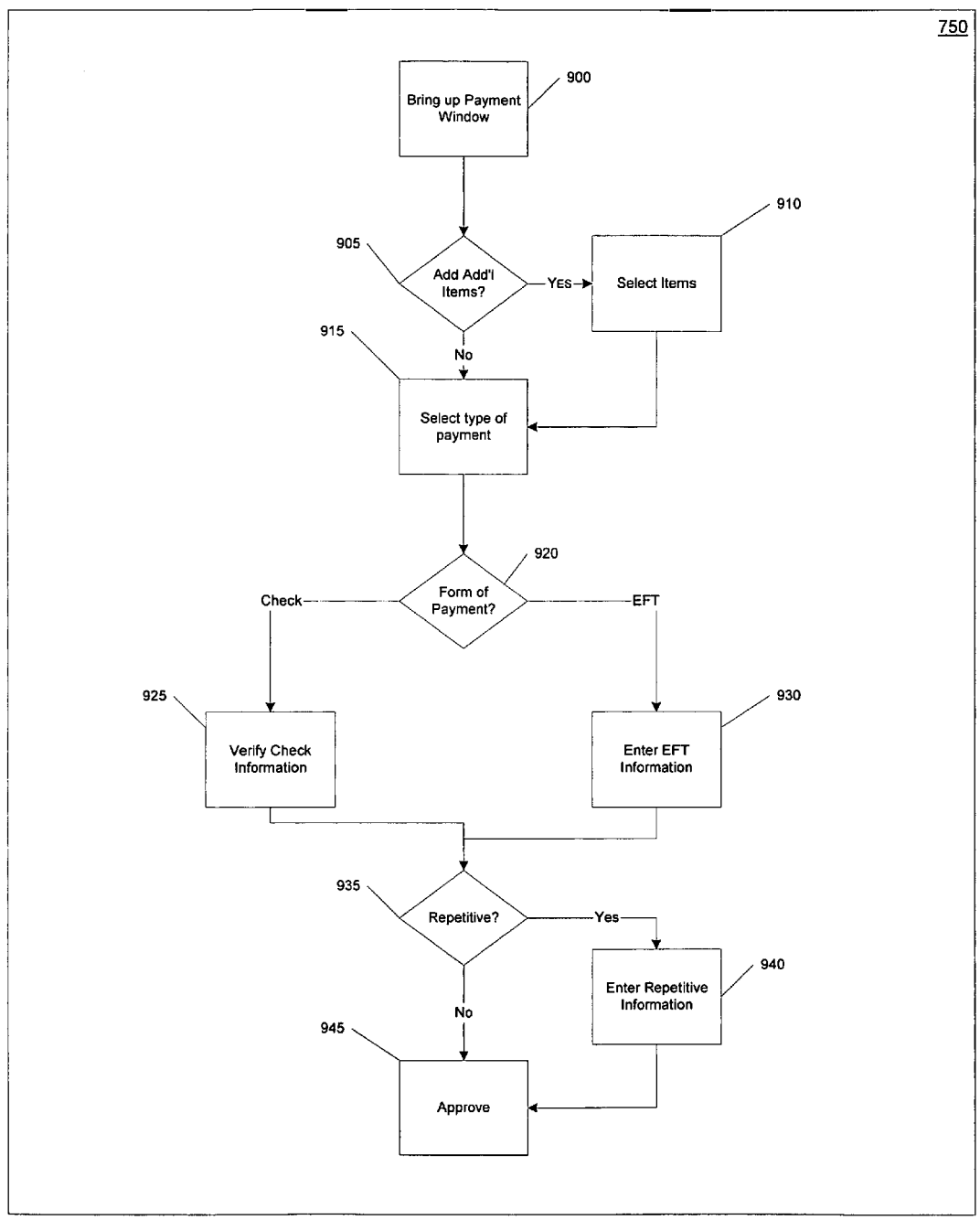
FIG. 9 is a flowchart of the steps performed in executing a line item payment in a manner consistent with the principles of the present invention.

FIG. 9 is a flowchart of the line item payment process 750. The payment processing window is displayed (step 900). The payment processing window displays the details on the particular line item data selected. In addition, it displays whether a payment has already been made for that item and the status of the item. The claim handler has the option of adding additional items to this particular line item payment, so that multiple line items can be paid with a single check or electronic fund transfer (step 905). If additional items were to be selected by the claim handler, the claim handler may select additional types of items (step 910). The type of payment is selected (step 915). The payment may be in terms of the actual cash value (ACV) or the replacement cost (RC). For each individual line item, ACV or RC can be selected by the claim handler based on the coverage of the policy.

Once the claim handler has added all items to this particular payment, the claim handler can choose whether a check or an electronic fund transfer takes place (step 920). If a check is going to be cut (step 925), the claim handler verifies all of the check and draft information including the name and address of the claimant. The name and address of the claimant can be changed at that point. If an electronic fund transfer is going to be the form of payment (step 930), claimant information is once again verified and electronic fund transfer information, such as the routing number and account number, is entered by the claim handler or is drawn from the claimant database entry for the claimant.

The claim handler sets up whether this payment is a single payment or a repetitive payment (step 935). Repetitive payments are used where, for example, a worker's compensation claim had a disability payment paid periodically to the claimant. If a repetitive payment is to be made, the repetitive payment information is entered (step 940). Repetitive payment information includes generally the start date, end date, number of payments, and the frequency of the payments. Next, the claim handler approves the settlement (step 945). Approval causes the insurance host server 130 to establish a payment through the insurance back office system 140, as will be discussed in the fulfillment of line item data process 430.

Preauthorized Payment Process

Figure 10:
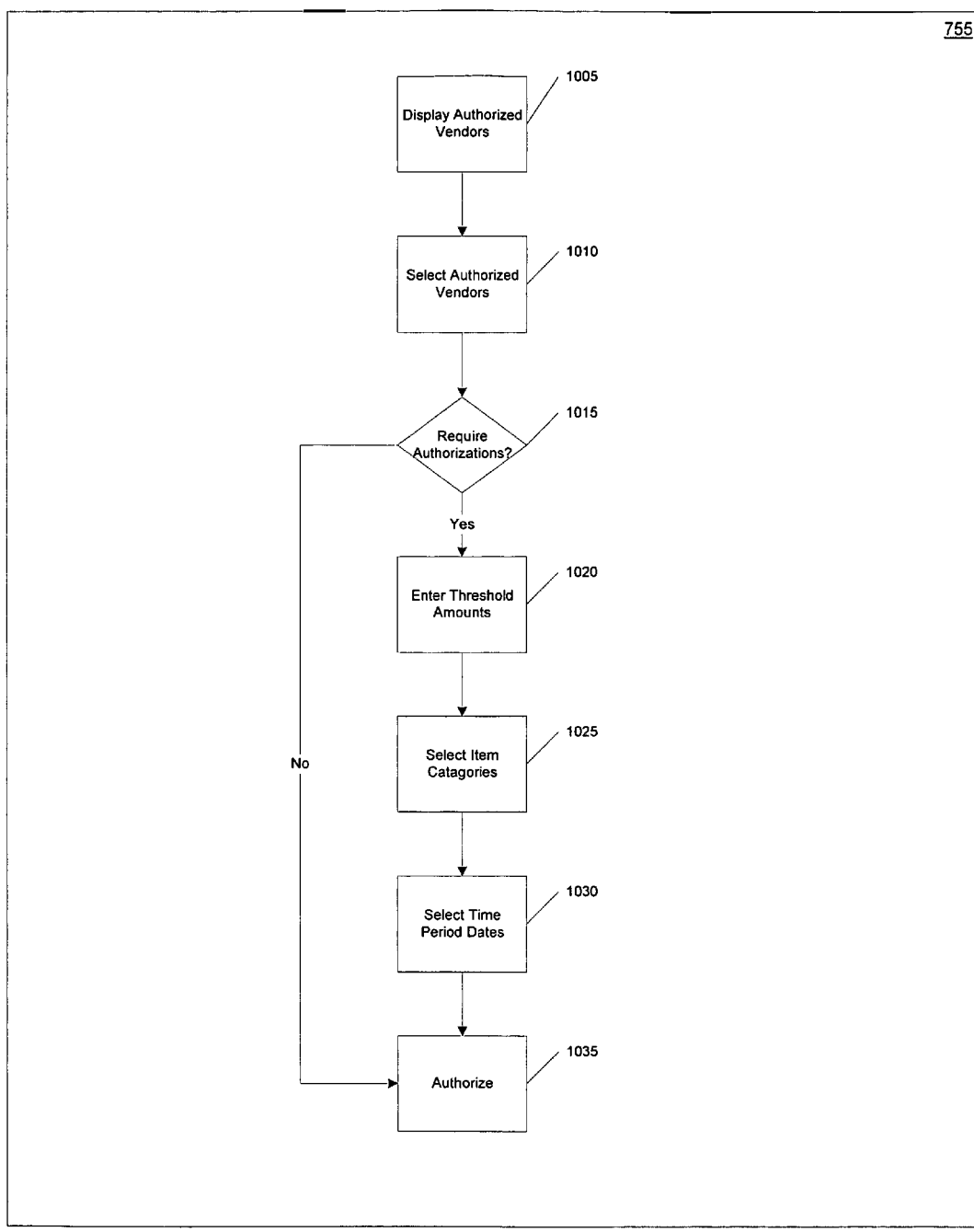
FIG. 10 is a flowchart of the steps performed in executing preauthorized payment in a manner consistent with the principles of the present invention.

FIG. 10 illustrates the execute preauthorized payment process 755. The execute preauthorized payment process can be entered by the claim handler either with an item selected or without an item selected. The preauthorized payment screen is displayed (step 1005). The preauthorization screen displays the claimant level information, a list of authorized vendors, a list of any excluded vendors, and other appropriate information. Next, the claim handler selects which authorized vendors are going to be preauthorized for the line's inventoried damages (step 1010) and, in addition, the claim handler indicates whether further authorization is required (step 1015). If no authorization is required, then the claim handler proceeds to authorization (step 1035).

However, if authorization is required, threshold amounts are entered (step 1020). There are two types of threshold amounts: total payment and single item. For a total payment threshold amount the claim handler enters a total amount that could not be exceeded for all items within a line level. For single item threshold amounts, the claim handler enters the maximum amount authorized for any given single line item. The claim handler can select certain categories for the preauthorization (step 1025), and the claim handler can select a time period within which preauthorization on vendor payments can occur (step 1030). For instance, the claim handler could enter a start date, an end date, and/or a maximum days allowed after the claim is closed in which to perform a vendor transaction. The authorization step is where the claim handler authorizes the preauthorization on all line item data within a particular line level that meet the authorization criteria established previously in the process (step 1035).

Once the claim handler authorizes, the insurance host server 130 examines all entries in the line item level database for that line level and preauthorizes all line item level entries meeting the authorization criteria. When the fulfillment of line item data process 430 occurs, the line items preauthorized are placed in a purchase order sent from the insurance host server 130 to vendor system 150 informing the vendors of the preauthorization.

Fulfillment of Line Item Data

Figure 11:
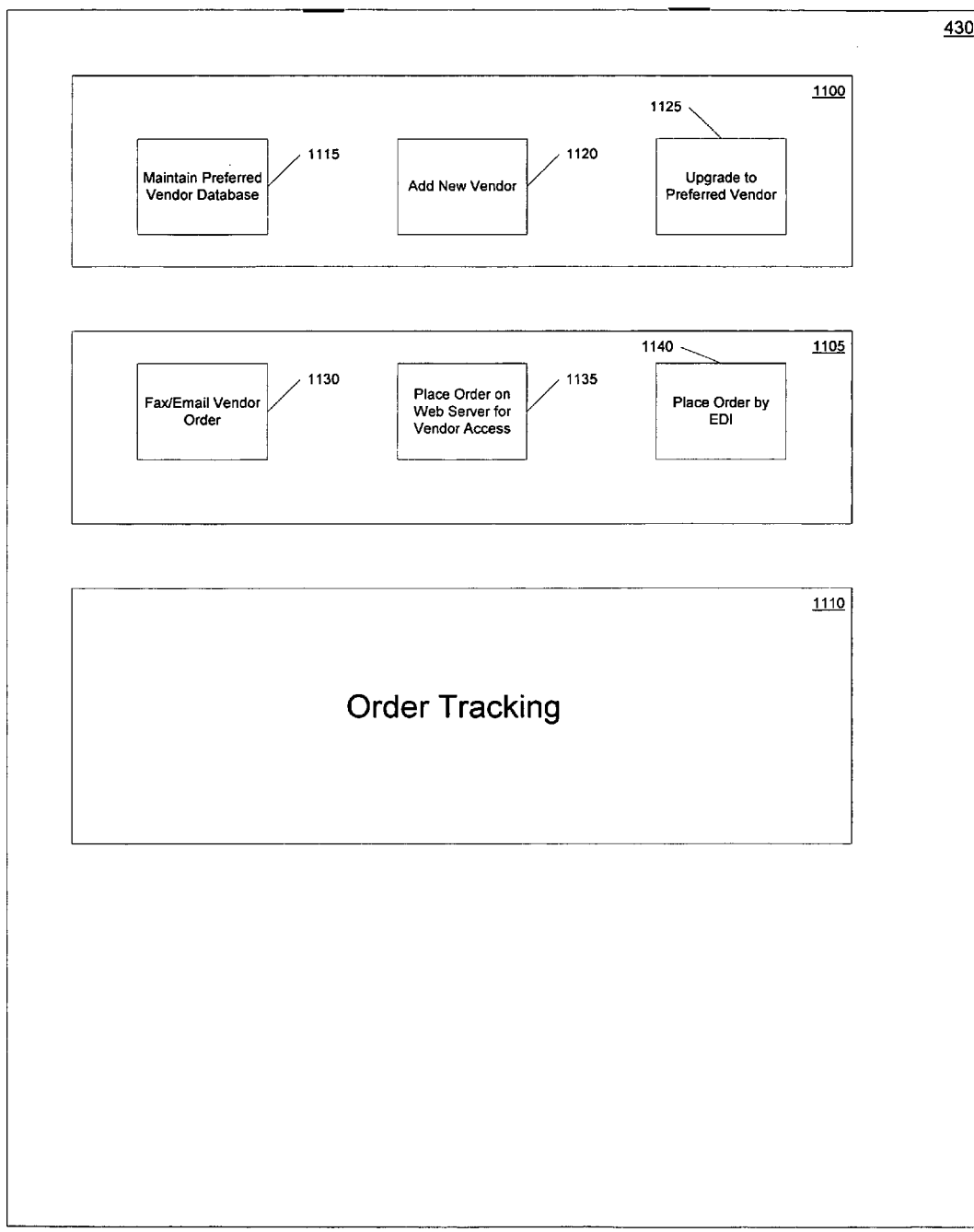
FIG. 11 is a block diagram of the processes that occur in the fulfillment of line item data in a manner consistent with the principles of the present invention.

FIG. 11 illustrates the processes within the fulfillment of line item data process 430. The processes follow in three major groups: vendor database processes 1100; order placement processes 1105; and order tracking process 1110. Vendor database processes 1100 consists of three processes: maintaining the preferred vendor database 1115; adding new vendors 1120; and upgrading vendors to preferred vendor status 1125. All vendor information is maintained in a vendor database residing in the mass storage of insurance host server 130. Vendor order placement process 1105 consists of three processes: faxing or e-mailing the vendor the order 1130; placing the order on a web server for vendor access 1135; and placing the order by electronic data interchange 1140.

The vendor database is accessed through the processes in vendor database processes 1100. The add new vendor process 1120 allows a claim handler client 120 access to the vendor database on insurance host server 130. Vendors may be generic vendors, a parent vendor, or a franchise vendor. If a vendor is a parent vendor, this indicates that they are in a franchiser relationship with other franchisee vendors. The default setting is for a vendor to be a generic vendor. If a vendor is selected as a franchise vendor, the claim handler has the option of finding the parent vendor to affiliate this vendor with. The vendor database information includes the name of the vendor, the address, the type of products that this vendor supplies, phone numbers, e-mail address, as well as tax ID numbers, and the type of organization.

When a new vendor is established, the claim handler can order a Dunn & Bradstreet report and also select whether this vendor is approved or not approved. In general, a vendor is not be approved until a claim handler has done some form of research on the vendor, either a Dunn & Bradstreet report and/or personally speaking with the vendor. Once the vendor is added to the system in process 1120, the upgrade to preferred vendor process 1125 can be run to upgrade the vendor to preferred status. A vendor might not be approved until some sort of vendor contract specifying item cost discount levels and customer service level agreements is established.

Generally in the maintain vendor database process 1115, the claim handler or other person accesses the insurance host server 130 to update and maintain preferred vendor database information. New Dunn & Bradstreet reports can be generated; a bill paying score can be entered; a record of yearly purchases from this vendor can be maintained; and a general level of vendor relationship can be monitored. The level of vendor relationship can range anywhere from poor, to average, to excellent or through gradations in between. Vendor performance can also note the time at which the vendor began operating; the date at which they became a preferred vendor; the number of complaints that have been lodged by claimants against this vendor with notes associating each complaint; the number of complaints that are not resolved; and the number of unfavorable comments received through standard customer feedback. In addition, inspection information can be maintained on this vendor. Frequently, vendors are the subject of periodic inspections by insurance company inspectors or outside inspectors hired by insurance companies. The database can maintain the total number of inspections, the number of successful inspections, the number of unsuccessful inspections, and other data relating to inspection criteria.

In addition, the vendor's maintenance process 1115 also includes detailed listing of the vendor's products and services offered. The products and services may be broken down into categories with detailed listings of the different items offered. This information may be entered by the claim handler from the claim handler client 120, may be uploaded via electronic data interchange from another system, or may be based upon the product database maintained at vendor system 150 or uploaded to insurance host server 130. This information is used to populate the vendors that are relevant for any given item during the replacement process. For example, if ABC Electronics is classified as a vendor supplying stereo equipment for the Chicago area and a claim is entered for a Chicago insured for a stereo, the system will provide ABC Electronics as a potential replacement vendor.

In process 1125, the claim handler may opt to upgrade the vendor to a preferred vendor. Preferred vendors are given preference when executing vendor transfers or preauthorized payment. Generally, only preferred vendors appear on the claim handler interface when giving the claim handler the option of using the execute vendor transfer or execute preauthorized payment options. In addition to processes 1115, 1120 and 1125, the vendor database can also be queried so that the claim handler can quickly locate a vendor to make changes, upgrades, or to delete the vendor from the system.

Process 1105 is dedicated to the placement of orders with vendors. Orders may be placed by fax or e-mail to the vendor, as shown in procedure 1130. The fax and e-mail information is drawn from the vendor database. A vendor with no web access or electronic data interchange (EDI) capability may opt for the fax/e-mail option. If this option is selected, when the insurance host server 130 and insurance back office system 140 are directed by the execute vendor transfer 745 or execute preauthorized payment 755 processes to execute an order with the vendor, the order is placed by fax or e-mail to the vendor. The vendor then replies either by e-mail or by telephone to confirm to the insurance back office system/insurance host server combination that the order has been received.

Process 1135 shows that an order to a vendor may be placed on a web server at insurance host server 130 so that the vendor could logon from vendor system 150 in order to view a list of that day's currently placed orders. The vendor prints out a list of those orders from his local vendor system 150 and indicate to the insurance host server 130 that those orders have been received.

In systems consistent with the invention, the vendor system 150 interfaces to the insurance host server 130 by electronic data interchange or EDI so that orders can be placed directly between the insurance host server 130 and the vendor system without any manual interaction. In this method, when execute vendor transfer 745 or execute preauthorized payment 755 processes indicate that a vendor order should be placed, the insurance host server 130 communicates directly to vendor system 150 by way of EDI to directly place the order with the vendor system. The vendor system can then electronically indicate to the insurance host server 130 that such order has been received and confirmed.

Process 1110 order tracking is dedicated to updating the insurance host server from the vendor system on the status of all placed orders. In systems consistent with the invention, the vendor system updates the insurance host server via electronic data interchange on the status of all currently placed orders. The vendor system indicates whether such orders are fulfilled, placed, or pending. In addition, the vendor system 150 may indicate that a particular order is unable to be placed and, if so, notifies insurance host server 130 which then places the order with another vendor or, if that is not possible, send a message to the claim handler client 120 indicating that that line item is not able to be fulfilled via the vendor. Insurance host server 130 constantly updates the line item level database with the tracking status of all vendor placed orders.

The foregoing description of an implementation of the invention has been presented for purposes of illustration and description. It is not exhaustive and does not limit the invention to the precise form disclosed. While often the invention was discussed in terms of property and casualty lines of insurance, this invention is flexible enough to be used over a wide variety of insurance lines, including, but not limited to, automotive, homeowners, life, property, casualty, workers compensation, health and other lines. Modifications and variations are possible in light of the above teachings or may be acquired from practicing of the invention. For example, the described implementation includes software, but the present invention may be implemented as a combination of hardware and software, or in hardware alone. The invention may be implemented with both object oriented and non-object oriented programming systems. Additionally, although aspects of the present invention are described as being stored in memory, one skilled in the art will appreciate that these aspects can also be stored on other types of computer-readable media, such as secondary storage devices, like hard disks, floppy disks, or CD-ROM; a carrier wave from the Internet or other propagation medium; or other forms of RAM or ROM. The scope of the invention is defined by the claims and their equivalents.

What is claimed is:

1. A method of evaluating line item data, the method comprising:
   displaying via a display of a computer network at least one line item of an insurance related claim presented to an insurer;
   accessing from the computer network a database of excluded vendors and authorized vendors to fulfill the insurance related claim;
   displaying via the computer network a list of authorized vendors and a list of excluded vendors that correspond with the at least one line item, wherein the authorized vendors are selected from the group consisting of vendors with a preferred status as determined by the insurer, franchised vendors, and vendors that allow an upgrade;
   accessing from the computer network vendor data associated with the list of authorized vendors and the list of excluded vendors;
   receiving from the computer network a selection of at least one vendor from the list of authorized vendors to fulfill the insurance related claim; and
   receiving authorization from a claim handler to execute payment of the selected at least one line item of the insurance related claim.

2. The method of claim 1 further comprising performing an update of the database of authorized vendors.

3. The method of claim 1 further comprising receiving authorization to execute payment for additional line items, adding payment authorizations associated with one payee, and executing a single payment of a plurality of line items to the payee.

4. The method of claim 1 wherein the authorization is for repetitive payments, and receiving information of at least one of start date, end date, number of payments and frequency of payments.

5. The method of claim 1 further comprising maintaining the database of authorized vendors by updating the vendor data selected from the group consisting of a bill paying score, vendor performance data, vendor financial health, vendor preferred status, vendor complaint data, vendor relationship level, vendor products and vendor services.

6. The method of claim 1 further comprising displaying an add vendor interface receiving identifying information regarding a new vendor, receiving vendor authorization data, and incorporating the new vendor into the database of authorized vendors.

7. The method of claim 1 further comprising receiving at least one line item in a central database.

8. The method of claim 1 wherein the vendor data information includes at least one of: names associated with the list of authorized vendors, addresses associated with the list of authorized vendors, types of products associated with the list of authorized vendors, types of supplies associated with the list of authorized vendors, phone numbers associated with the list of authorized vendors, electronic mail address associated with the list of authorized vendors, tax ID numbers associated with the list of authorized vendors and types of organizations associated with the list of authorized vendors.

9. A method of evaluating line item data, the method comprising:
   displaying via a display of a computer network at least one line item of an insurance related claim presented to an insurer;
   accessing from the computer network a database having a list of excluded vendors and authorized vendors to fulfill the insurance related claim;
   comparing the list of authorized vendors and the list of excluded vendors with the at least one line item, wherein the authorized vendors are selected from the group consisting of vendors with a preferred status as determined by the insurer, franchised vendors, and vendors that allow an upgrade;
   displaying via the computer network vendor data on the availability of the upgrade for the at least one line item;
   receiving from the computer network a selection of at least one vendor from the list of authorized vendors that corresponds with the at least one line item to fulfill the insurance related claim; and
   receiving authorization from a claim handler to execute at least one payment of the selected at least one line item of the insurance related claim.

10. The method of claim 9 wherein the at least one vendor is selected based on the availability of the upgrade of the at least one line item.

11. The method of claim 1 wherein authorization is for a payment in a form selected from the group consisting of a direct payment, vendor transfer, line item payment, and preauthorized payment.

12. The method of claim 11 further comprising allowing vendor transfer or preauthorized payment only when vendor data indicates the at least one vendor has the preferred status.

13. The method of claim 11 wherein the authorizing a direct payment comprises receiving an amount for a direct payment.

14. The method of claim 11 wherein the authorizing a direct payment comprises communicating with a back office system to issue a payment to a claimant.

15. The method of claim 11 wherein the authorized vendors are vendors that allow an upgrade and the executed payment is the vendor transfer, and wherein the receiving authorization further comprises receiving a selection of the availability of the upgrade.

16. The method of claim 11 wherein the executed payment is the vendor transfer, and wherein the receiving authorization further comprises verifying a deduction.

17. The method of claim 11 wherein the receiving authorization comprises:
   receiving the selection of at least one line item;
   receiving the selection of a form of payment; and
   authorizing the transaction.

18. The method of claim 17 wherein the receiving authorization comprises receiving a form of payment selected from the group consisting of a check and an electronic funds transfer.

19. The method of claim 18 wherein the receiving the form of payment comprises receiving a check and further comprises receiving checking account information.

20. The method of claim 18 wherein the receiving the form of payment comprises receiving an electronic funds transfer and further comprises receiving electronic funds transfer information.

21. The method of claim 11 wherein the executed payment is the preauthorized payment and the receiving authorization further comprises:
   displaying the list of authorized vendors and the at least one line item on a preauthorized payment screen; and
   receiving a selection of at least one preauthorized vendor from the list of authorized vendors.

22. The method of claim 21 further comprising receiving a threshold amount for which payment will not exceed.

23. The method of claim 21 further comprising receiving a selection of item categories for which payment will be made.

24. The method of claim 21 further comprising receiving a date range for which payment will be made.

25. A system for evaluating line item data, comprising:
a processor for executing programs; and
a memory for storing a program executable by the processor, the stored program including instructions for (i) displaying at least one line item of an insurance related claim presented to an insurer; (ii) accessing a database of vendors having a list of authorized vendors and a list of excluded vendors to fulfill the insurance related claim; (iii) displaying the list of authorized vendors and the list of excluded vendors that correspond with the at least one line item, wherein the authorized vendors are selected from the group consisting of vendors with a preferred status, franchised vendors, or vendors that allow an upgrade; (iv) accessing vendor data associated with the list of authorized vendors and the list of excluded vendors; (v) receiving a selection of at least one vendor from the list of authorized vendors to fulfill the insurance related claim; and (vi) receiving authorization from a claim handler to execute payment of the selected at least one line item of the insurance related claim.

26. The system of claim 25 wherein the authorization is for a payment in a form selected from the group consisting of direct payment, vendor transfer, line item payment, and preauthorized payment.

27. The system of claim 26 wherein the payment is the direct payment and the receiving authorization further includes receiving an amount for the direct payment.

28. The system of claim 26 wherein the payment is the direct payment and the receiving authorization further includes communicating with a back office system to issue payment to a claimant.

29. The system of claim 26 wherein the authorized vendors are vendors that allow an upgrade and the executed payment is the vendor transfer, and wherein the receiving authorization includes receiving a selection of an availability of the upgrade.

30. The system of claim 26 wherein the executed payment is the vendor transfer, and wherein the receiving authorization includes verifying a deduction.

31. The system of claim 26 wherein the receiving authorization includes (i) receiving the selection of at least one line item; (ii) receiving the selection of a form of a payment; and (iii) authorizing the transaction.

32. The system of claim 31 wherein receiving the selection of a form of payment includes receiving a form of payment selected from the group consisting of a check and an electronic funds transfer.

33. The system of claim 32 wherein the form of payment is the check and the receiving a form of payment further includes receiving checking account information.

34. The system of claim 32 wherein the form of payment is the electronic fund transfer and the receiving a form of payment further includes receiving electronic funds transfer information.

35. The system of claim 26 wherein the payment is the preauthorized payment and the receiving authorization includes: (i) displaying the list of authorized vendors and the at least one line item on a preauthorized payment screen; and (ii) receiving a selection of at least one preauthorized vendor from the list of authorized vendors.

36. The system of claim 35 wherein the stored program further includes instructions for receiving a threshold amount for which payment will not exceed.

37. The system of claim 35 wherein the stored program further includes instructions for receiving a selection of item categories for which payment will be made.

38. The system of claim 35 wherein the stored program further includes instructions for receiving a date range for which payment will be made.

39. A computer readable medium containing instructions for controlling a computer system to perform a method for evaluating line item data, the method comprising:
displaying at least one line item of an insurance related claim presented to an insurer;
accessing a database of excluded vendors and authorized vendors to fulfill the said insurance related claim;
displaying a list of authorized vendors and a list of excluded vendors that correspond with the at least one line item, wherein the authorized vendors are selected from the group consisting of vendors with a preferred status as determined by the insurer, franchised vendors, and vendors that allow an upgrade;
accessing vendor data associated with the list of authorized vendors and the list of excluded vendors;
receiving a selection of at least one vendor from the list of authorized vendors to fulfill the insurance related claim; and
receiving authorization from a claim handler to execute payment of the selected at least one line item of the insurance related claim.

40. The computer readable medium of claim 29 wherein the authorization is for a payment in a form selected from the group consisting of a direct payment, vendor transfer, line item payment, and preauthorized payment.

41. The computer readable medium of claim 40 wherein the payment is the direct payment and wherein the receiving authorization comprises receiving an amount for a direct payment.

42. The computer readable medium of claim 40 wherein the payment is the direct payment and wherein the receiving authorization comprises communicating with a back office system to issue payment to a claimant.

43. The computer readable medium of claim 40 wherein the payment is the vendor transfer and the vendors with a preferred status are the vendors that allow the upgrade, and wherein the receiving authorization further comprises receiving a selection of the availability of the upgrade.

44. The computer readable medium of claim 40 wherein the payment is the vendor transfer and wherein the receiving authorization further comprises verifying a deduction.

45. The computer readable medium of claim 40 wherein the receiving authorization comprises:
receiving the selection of at least one line item;
receiving the selection of a form of payment; and
authorizing the transaction.

46. The computer readable medium of claim 45 wherein the receiving authorization comprises receiving a form of payment selected from the group consisting of a check and an electronic funds transfer.

47. The computer readable medium of claim 46 wherein the the form of payment is the check and the receiving a form of payment further comprises receiving checking account information.

48. The computer readable medium of claim 46 wherein the the form of payment is the electronic fund transfer and the receiving a form of payment further comprises receiving electronic funds transfer information.

49. The computer readable medium of claim 40 wherein the receiving authorization comprises:
- displaying the list of authorized vendors and the at least one line item on a preauthorized payment screen; and
- receiving a selection of at least one preauthorized vendor from the list of authorized vendors.

50. The computer readable medium of claim 49 further comprising receiving a threshold amount for which payment will not exceed.

51. The computer readable medium of claim 49 further comprising receiving a selection of item categories for which payment will be made.

52. The computer readable medium of claim 49 further comprising receiving a date range for which payment will be made.

* * * * *

UNITED STATES PATENT AND TRADEMARK OFFICE
CERTIFICATE OF CORRECTION

PATENT NO. : 7,124,112 B1
APPLICATION NO. : 09/667612
DATED : October 17, 2006
INVENTOR(S) : G. Victor Guyan et al.

It is certified that error appears in the above-identified patent and that said Letters Patent is hereby corrected as shown below:

In column 2, line 67, immediately after "interface" insert --;-- (semicolon).

In column 4, line 43, before "processor 235," delete "a" and substitute --as-- in its place.

In column 4, lines 44-45, delete "The processor 235, through a bus 240." and substitute --The processor 235, memory 245, I/O controller 250, and the network interface 260 are interconnected through a bus 240.-- in its place.

In column 4, line 49, after "server is contemplated" delete "In" and substitute --in-- in its place.

In column 8, line 17, after "given an opportunity to" delete "reenter" and substitute --re-enter-- in its place.

In column 9, line 1, before "downloaded to the" insert --be--.

In column 9, line 15, after "plurality of item" delete "tree" and substitute --trees-- in its place.

In column 9, line 16, after "different item" delete "trees" and substitute --tree-- in its place.

In column 12, line 66, before "be approved until a claim" insert --to--.

In the Claims

Column 18, in claim 47, line 2, delete "the the form" and substitute --the form-- in its place.

UNITED STATES PATENT AND TRADEMARK OFFICE
CERTIFICATE OF CORRECTION

PATENT NO.        : 7,124,112 B1
APPLICATION NO. : 09/667612
DATED             : October 17, 2006
INVENTOR(S)       : G. Victor Guyan et al.

It is certified that error appears in the above-identified patent and that said Letters Patent is hereby corrected as shown below:

In the Claims (cont'd)

Column 18, in claim 48, line 2, delete "the the form" and substitute --the form-- in its place.

Signed and Sealed this

First Day of May, 2007

JON W. DUDAS
*Director of the United States Patent and Trademark Office*